United States Patent

[11] 3,578,805

[72] Inventor Lloyd K. Dutton
 West Paterson, N.J.
[21] Appl. No. 804,581
[22] Filed Mar. 5, 1969
[45] Patented May 18, 1971
[73] Assignee Mooney Brothers Corporation
 Little Falls, N.J.

[54] TUBE COUPLING
 4 Claims, 4 Drawing Figs.
[52] U.S. Cl. .................................................. 285/55,
 285/343, 285/348, 285/369
[51] Int. Cl. .................................................. F16l 9/14
[50] Field of Search ...................................... 285/55,
 343, 364, 351, 423, 337, 348, 342

[56] References Cited
UNITED STATES PATENTS
| 834,618 | 10/1906 | Herrick | 285/337 |
| 3,188,122 | 6/1965 | Smith | 285/369X |
| 3,233,920 | 2/1966 | Ammann | 285/423X |
| 3,432,187 | 3/1969 | Mooney et al. | 285/55 |

FOREIGN PATENTS
| 475,644 | 4/1929 | Germany | 285/342 |

Primary Examiner—Dave W. Arola
Attorney—Samuelson & Jacob

ABSTRACT: A tube coupling for coupling tubes capable of carrying corrosive fluids, the tube coupling employing an outer body of relatively rigid, high strength material, an inner tubular member of a resiliently deformable, generally inert, corrosion resistant material such as a fluorocarbon resin received within the outer body and having a bore for receiving a tube therein, an annulus of elastomeric material having a first portion placed around the inner tubular member adjacent an end thereof and a second portion extending beyond the end of the inner tubular member, the annulus retaining the inner tubular member within the outer body against inadvertent removal therefrom, a nut threaded onto the outer body and means coupling the nut and the annulus such that upon threading the nut along the outer body the coupling means will axially contract the annulus to radially contract the inside diameter of the first portion of the annulus and thereby deform the inner tubular member radially inwardly to grip the tube therein and establish a seal between the inner tubular member and the tube therein and to radially contract the inside diameter of the second portion of the annulus and thereby grip the tube therein in response to axial movement of the threaded member.

PATENTED MAY 18 1971 3,578,805
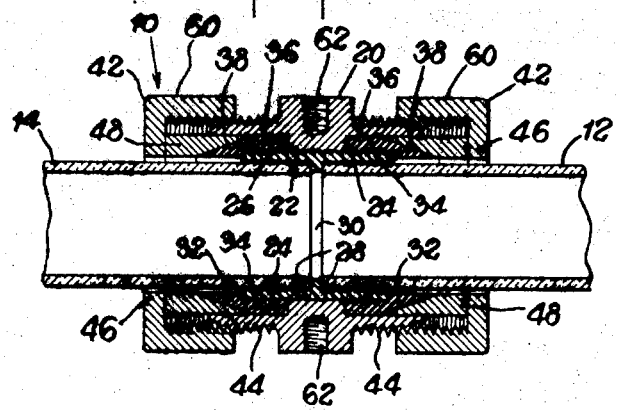
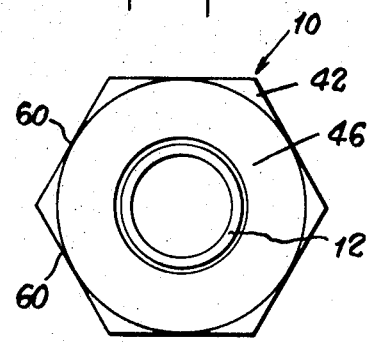
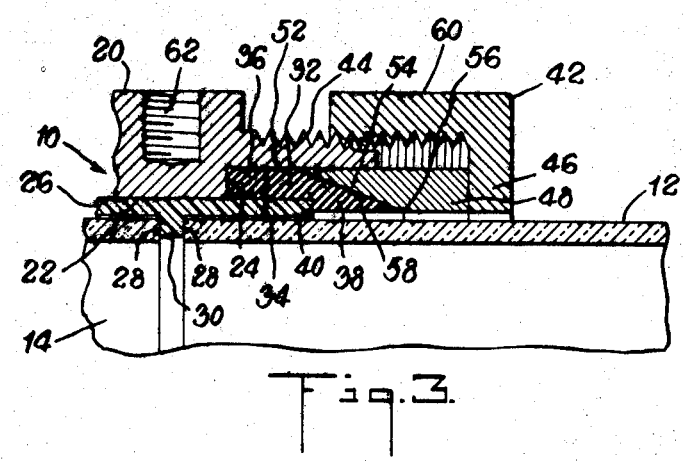
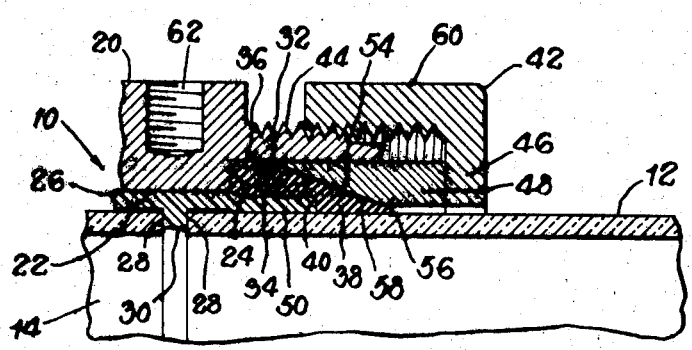
INVENTOR
LLOYD K. DUTTON
BY
Samuelson + Jacob
ATTORNEYS

TUBE COUPLING

The present invention relates generally to tube couplings and pertains more specifically to tube couplings for coupling tubes capable of carrying corrosive fluids and assuring that the corrosive fluid is isolated from those structural components of the coupling which may be susceptible to corrosion. The term "corrosive fluids" is meant to encompass all fluids which should be isolated from those structural components of the coupling which are susceptible to some unfavorable reaction with the fluid conducted through the coupling, including those fluids which might themselves be contaminated or otherwise degraded by contact with the structural components, such as pure or ultra-pure fluids which must be maintained at a high level of purity.

In many laboratory and manufacturing plant installations, various experiments and processes are carried out which require that a variety of corrosive fluids be conducted through networks of tubes. The tubes are usually fabricated of generally inert, corrosion resistant materials. Many of these materials, such as glass and ceramics, are frangible and any coupling which is employed to join the tubes at the various junctures in these networks should exert a firm, but gentle grip upon the joined tubes so as to maintain the connection rigid without placing undue stress upon the tubes themselves. At the same time, the joints should be sealed against leakage of the corrosive fluid from the connection and against the exposure of corrodible component parts of the coupling to the corrosive fluid.

It is therefore an important object of the invention to provide a tube coupling which affords a rigid connection between tubes of corrosion resistant material and which confines corrosive fluids passing through the connection to contact with only generally inert, corrosion resistant component parts of the coupling.

Another object of the invention is to provide a tube coupling combining the relatively rigid, high strength characteristics of metallic components such as steel or aluminum with the resiliently deformable and corrosion resistant characteristics of certain generally inert synthetic resin materials such as fluorocarbon resins.

A further object of the invention is to provide a tube coupling in which the corrosion resistant characteristics of synthetic resin materials such as fluorocarbon resins are used to best advantage while the gripping characteristics of elastomeric materials are employed for more positively securing together coupled tubes.

A still further object of the invention is to provide a tube coupling having a simplified construction with a minimum number of component parts, each having a readily fabricated configuration.

The above objects, as well as further objects and advantages, are attained in the invention which can be described briefly as a tube coupling for coupling tubes capable of carrying corrosive fluids, the tube coupling comprising an outer body of relatively rigid, high strength material including an axial bore having an axial length between opposite ends, the outer body including a shoulder adjacent at least one of the opposite ends of the bore, an inner tubular member of a resiliently deformable, generally inert, corrosion resistant material such as a fluorocarbon resin, received within the bore of the outer body and having an inside diameter complementary to a tube to be received therein and a relatively larger outside diameter, the inner member having an axial length between opposite ends greater than the length of the bore, means adjacent each of the opposite ends of the bore for retaining the inner tubular member within the bore of the outer body against inadvertent removal therefrom, the means including an annulus of elastomeric material having a first portion located around the inner tubular member adjacent one end thereof and abutting the shoulder in the bore, and a second portion extending axially away from the shoulder beyond the one end of the inner tubular member, the first portion having an inside diameter complementary to and overlapping the inner tubular member and the second portion having an inside diameter complementary to and overlapping a tube to be received therein, a threaded member threaded onto the outer body for axial movement relative thereto, and means coupling the threaded member the annulus for engaging and axially contracting the annulus to radially contract the inside diameter of the first portion thereof and thereby deform the first portion with concomitant deformation 8 the inner tubular member radially inwardly to grip the tube therein and establish a seal between the inner tubular member and the tube, and to radially contract the inside diameter of the second portion thereof and thereby deform the second portion radially inwardly to grip the tube therein in response to axial movement of the threaded member the inside diameter of the second portion of the annulus being smaller than the inside diameter of the first portion of the annulus, the annulus including a step between the inside diameters of the first and second portions thereof, the step abutting the one end of the inner tubular member, the first portion having a generally cylindrical outer surface and the second portion having an outer surface which tapers axially from a larger outside diameter at the generally cylindrical surface to a smaller outside diameter spaced axially away from the one end of the inner tubular member.

The invention will be more fully understood and still further objects and advantages will become apparent in the following detailed description of a preferred embodiment of the invention illustrated in the accompanying drawing, in which:

FIG. 1 is a longitudinal cross-sectional view of a junction between tubes and illustrating a tube coupling constructed in accordance with the invention;

FIG. 2 is an end view of the junction of FIG. 1;

FIG. 3 is an enlarged fragmentary view of a portion of the junction of FIG. 1; and FIG. 4 is an enlarged fragmentary view similar to FIG. 3, but with the component parts of the tube coupling in another position.

Referring now to the drawing, and especially to FIGS. 1 and 2, a tube coupling constructed in accordance with the invention is shown generally at 10 and is seen receiving the confronting ends of tubes 12 and 14 to be joined in a connection. The tubes 12 and 14 are fabricated of a corrosion resistant material such as glass.

Coupling 10 has an outer body 20 including a bore 22 extending axially between shoulders 24 at opposite ends of the bore 22. An inner tubular member shown in the form of a sleeve 26 of resiliently deformable, corrosion resistant material is received within the bore 22 and extends axially beyond the shoulders 24 of the bore. The inside diameter of sleeve 26 is complementary to the outside diameter of the tubes 12 and 14 so that the tubes are readily inserted into the sleeve and advanced within the sleeve until the end of each tube abuts a centering stop shoulder 28 provided by an annular rib 30 formed integral with the wall of sleeve 26 and having an inside diameter smaller than the inside diameter of the sleeve and the corresponding outside diameter of each tube.

In order to retain the sleeve 26 in place within the outer body 20 against inadvertent removal from the bore 22, an annulus 32 of elastomeric material is slipped over each end of the sleeve 26. Each annulus is received within a recess 34 in the outer body 20 and is brought into abutment with a shoulder 24.

Each annulus 32 has a first portion 36 located around the sleeve 26 adjacent one end thereof and abutting a shoulder 24, and a second portion 38 extending axially away from the shoulder 24 and beyond the corresponding end of the sleeve 26. The first portion 36 has an inside diameter which is complementary to the outside diameter of the sleeve 26 and overlaps the sleeve. The second portion 38 has an inside diameter which is complementary to the outside diameter of a tube 12 or 14 and overlaps the corresponding tube received within the coupling 10.

As best seen in FIGS. 1 and 3, the inside diameter of the second portion 38 is smaller than the inside diameter of the first portion 36 of the annulus 32 and a step 40 is established between the different inside diameters of the inner surface of the annulus 32. The step 40 abuts the corresponding end of the sleeve 26.

The sleeve 26 is preferably retained in place within the bore 22 of body 20 by providing the inside diameter of the first portion 36 of annulus 32 and the outside diameter of sleeve 26 with relative normal dimensions which require that the annulus be dilated in order to bring the first portion into the overlapping assembled position shown. Such dilation establishes a frictional force with which the annulus grips the sleeve so that the two annuli 32 retain the sleeve 26 within the bore 22 against inadvertent removal therefrom.

The abutting relationship between the steps 40 and the corresponding ends of the sleeve 26 also serves to retain the sleeve in place within the bore 22 of body 20. Thus, retention of the sleeve 26 may be accomplished either through the gripping action of the first portion 36 of each annulus upon the sleeve as set forth above, or by abutment of the steps 40 with the ends of the sleeve, or by a combination of both measures.

The tubes are clamped within the coupling by threaded members shown in the form of clamping nuts 42 which are threaded onto threaded portions 44 of the outer body 20 for axial movement relative to the outer body. Means are provided for coupling each nut 42 with a corresponding annulus 32 and are shown in the form of a flange portion 46 on each nut engaging a gland 48 which is located between each annulus 32 and a corresponding flange portion 46 for axial sliding movement relative to the outer body 20. The nuts 42 are ordinarily positioned to allow insertion of tubes 12 and 14 into sleeve 26 and annuli 32 as seen in FIG. 3. Upon the advancement of a nut 42 along the outer body, to the left as seen in FIG. 4, the flange 46 of the nut will engage a corresponding gland 48 and the gland will exert an axial pressure upon the annulus 32. Since the annulus is confined within the recess 34 and cannot expand either axially or radially outwardly, the axial pressure of the gland will contract the annulus axially and will contract the inside diameter of the first portion 36 of the annulus radially inwardly to deform the sleeve 26 against the tube 12 at 50. The deformation of sleeve 26 establishes a firm but gentle clamping force which will secure tube 12 within the sleeve 26 and within the coupling 10. At the same time, the deformation of sleeve 26 establishes a seal between the sleeve and the tube so that any corrosive fluid being conducted through the tubes is confined within the tubes and within the sleeve 26.

Such axial contraction of the annulus will also radially contract the inside diameter of the second portion 38 of the annulus such that the second portion 38 will bear against the corresponding tube 12 and exert a further gripping force upon the tube to more firmly secure the tube in place within the coupling. The seal established by the engagement of the sleeve 26 against the tube 12 (or 14) will preclude corrosive fluids which flow through the coupled tubes from contacting the annuli.

In order to enhance the tube-gripping action of the second portion 38 of each annulus while enabling the first portion 36 to deform the sleeve 26 as described above, the first portion is provided with a cylindrical outer surface 52 (see FIG. 3) and the second portion 38 is provided with a frustoconical outer surface 54 which tapers axially from the larger outside diameter of the first portion 36 to the smaller outside diameter at the outer end 56 of the annulus. Each gland 48 is provided with a complementary frustoconical inner surface 58 which engages and bears against the corresponding frustoconical outer surface 54 to axially contract each annulus and radially contract the inside diameters thereof in response to axial movement of each nut 42.

It is important that the joint thus established between the tubes 12 and 14 be relatively rigid as well as well sealed. Thus, the outer body 20 is constructed of a relatively rigid, high strength material, preferably a metal such as steel or aluminum. The outer body 20 and the sleeve 26 are long enough to receive a sufficient length of the tubes 12 and 14 to assure a relatively rigid connection between the tubes. The centering stop shoulders 28 provided by annular rib 30 assures that both tubes 12 and 14 will be inserted for such a sufficient length.

The outer body 20, as well as nuts 42, is provided with a wrenching configuration at 60 so as to enable the outer body 20, as well as the nuts 42, to be easily gripped for controlled advance of the nuts and a controlled buildup of the forces acting to grip the tubes. Such control is advantageous in view of the frangible nature of most of the corrosion resistant materials employed for the tubes 12 and 14. Additionally, the nature of the material of the outer body 20 permits ready modification of the outer body 20 to conform to the requirements of a particular installation. For example, one or more tapped holes, such as tapped holes 62, may be provided in the outer body for receiving anchor rods (not shown) which will hang or otherwise mount the coupling within the system in which the coupling 10 is installed.

Each annulus 32 is preferably fabricated of an elastomeric material such as rubber or Neoprene and is confined to recess 34, which communicates with sleeve 26, in order to attain controlled contraction of the annuli and the sleeve without interfering with the advancement of the nuts 42.

The sleeve 26 is preferably fabricated of a synthetic resin material such as a fluorocarbon resin. A fluorocarbon resin such as polytetrafluoroethylene has been found to provide adequate corrosion resistant characteristics as well as being resiliently deformable to the extent required. Because the sleeve 26 is a simple cylindrical shape, the sleeve is easily fabricated and readily replaced.

It is to be understood that the above detailed description of a preferred embodiment of the invention is provided by way of example only. Various details of design and construction may be modified without departing from the true spirit and scope of the invention.

I claim:

1. A tube coupling for coupling tubes capable of carrying corrosive fluids, said tube coupling comprising:
    an outer body of relatively rigid, high strength material including an axial bore having an axial length between opposite ends, said outer body including a shoulder adjacent at least one of said opposite ends of the bore;
    an inner tubular member of resiliently deformable, generally inert, corrosion resistant material such as a fluorocarbon resin received within the bore of the outer body and having an inside diameter complementary to a tube to be received therein and a relatively larger outside diameter, said inner tubular member having an axial length between opposite ends greater than the length of said bore;
    means adjacent each of said opposite ends of the bore for retaining the inner tubular member within the bore of the outer body against inadvertent removal therefrom, said means including an annulus of elastomeric material having a first portion located around the inner tubular member adjacent one end thereof and abutting the shoulder in the bore and a second portion extending axially away from the shoulder beyond said one end of the inner tubular member, said first portion having an inside diameter complementary to and overlapping said inner tubular member and said second portion having an inside diameter complementary to and overlapping a tube to be received therein;
    a threaded member threaded onto the outer body for axial movement relative thereto;
    means coupling the threaded member and the annulus for engaging and axially contracting the annulus to radially contract the inside diameter of the first portion thereof and thereby deform the first portion with concomitant deformation of the inner tubular member radially inwardly to grip the tube therein and establish a seal between the inner tubular member and the tube, and to radially contract the inside diameter of the second portion thereof and thereby deform the second portion radially inwardly to grip the tube therein in response to axial movement of the threaded member;

the inside diameter of the second portion of the annulus being smaller than the inside diameter of the first portion of the annulus, the annulus including a step between the inside diameters of the first and second portions thereof, said step abutting said one end of the inner tubular member;

said first portion having a generally cylindrical outer surface; and said second portion having an outer surface which tapers axially from a larger outside diameter at said generally cylindrical surface to a smaller outside diameter spaced axially away from said one end of the inner tubular member.

2. A tube coupling for coupling tubes capable of carrying corrosive fluids, said tube coupling comprising:

an outer body of relatively rigid, high strength material including an axial bore having an axial length between opposite ends, said outer body including a shoulder adjacent at least one of said opposite ends of the bore;

an inner tubular member of resiliently deformable, generally inert, corrosion resistant material such as a fluorocarbon resin received within the bore of the outer body and having an inside diameter complementary to a tube to be received therein and a relatively larger outside diameter, said inner tubular member having an axial length between opposite ends greater than the length of said bore;

means adjacent each of said opposite ends of the bore for retaining the inner tubular member within the bore of the outer body against inadvertent removal therefrom, said means including an annulus of elastomeric material having a first portion located around the inner tubular member adjacent one end thereof and abutting the shoulder in the bore and a second portion extending axially away from the shoulder beyond said one end of the inner tubular member, said first portion having an inside diameter complementary to and overlapping said inner tubular member and said second portion having an inside diameter complementary to and overlapping a tube to be received therein;

a threaded member threaded onto the outer body for axial movement relative thereto;

means coupling the threaded member and the annulus for engaging and axially contracting the annulus to radially contract the inside diameter of the first portion thereof and thereby deform the first portion with concomitant deformation of the inner tubular member radially inwardly to grip the tube therein and establish a seal between the inner tubular member and the tube, and to radially contract the inside diameter of the second portion thereof and thereby deform the second portion radially inwardly to grip the tube therein in response to axial movement of the threaded member;

said first portion of the annulus having a generally cylindrical outer surface;

said second portion of the annulus having a frustoconical outer surface; and said means coupling the threaded member and the annulus including a frustoconical inner surface complementary to said frustoconical outer surface of the second portion and engageable therewith.

3. A tube coupling for coupling tubes capable of carrying corrosive fluids, said tube coupling comprising:

an outer body of relatively rigid, high strength material including an axial bore having an axial length between opposite ends, said outer body including a shoulder adjacent each of said opposite ends of the bore;

an inner tubular member of resiliently deformable, generally inert, corrosion resistant material such as a fluorocarbon resin received within the bore of the outer body and having an inside diameter complementary to a tube to be received therein and a relatively larger outside diameter, said inner tubular member having an axial length between opposite ends greater than the length of said bore and projecting axially outwardly beyond each shoulder of the outer body;

means adjacent each of said opposite ends of the bore for retaining the inner tubular member within the bore of the outer body against inadvertent removal therefrom, said means including an annulus of elastomeric material adjacent each end of the inner tubular member, each annulus having a first portion located around the inner tubular member adjacent an end thereof and abutting a corresponding shoulder in the bore and a second portion extending axially away from the corresponding shoulder beyond said end of the inner tubular member, said first portion having an inside diameter complementary to and overlapping said inner tubular member and said second portion having an inside diameter smaller than the inside diameter of the first portion and complementary to and overlapping a tube to be received therein;

a threaded member threaded onto each end of the outer body for axial movement relative thereto;

means coupling each threaded member with an annulus for engaging and axially contracting the annulus to radially contract the inside diameter of the first portion thereof and thereby deform the first portion with concomitant deformation of the inner tubular member radially inwardly to grip the tube therein and establish a seal between the inner tubular member and the tube, and to radially contract the inside diameter of the second portion thereof and thereby deform the second portion radially inwardly to grip the tube therein in response to axial movement of the corresponding threaded member;

each annulus including a step between the inside diameters of the first and second portions thereof, each said step abutting a corresponding end of the inner tubular member;

each first portion having a generally cylindrical outer surface;

each second portion having a frustoconical outer surface; and said means coupling each threaded member and each annulus including a frustoconical inner surface complementary to said frustoconical outer surface of a corresponding second portion and engageable therewith.

4. The tube coupling of claim 3 wherein:

each threaded member is a nut; and the means coupling each threaded member and a corresponding annulus include a flange integral with the nut and an axially slideable annular gland located between each annulus and a corresponding flange, each gland including said frustoconical inner surface and each flange engaging a corresponding gland to urge the gland against a corresponding annulus in response to movement of the corresponding nut along the outer body.